Nov. 9, 1943.   W. W. EATON   2,333,772

SPEED CONTROL FOR MOTOR DRIVEN CAMERAS

Filed June 4, 1942

WILLIAM W. EATON
INVENTOR

BY
ATT'Y & AG'T

Patented Nov. 9, 1943

2,333,772

UNITED STATES PATENT OFFICE 2,333,772

SPEED CONTROL FOR MOTOR DRIVEN CAMERAS

William W. Eaton, Washington, D. C., assignor to Eastman Kodak Company, Rochester, N. Y., a corporation of New Jersey Application June 4, 1942, Serial No. 445,727

3 Claims. (Cl. 171—221)

This invention relates to speed controls for motor driven cameras, and a principal object thereof is the provision of means whereby a camera such as is used in taking "moving" pictures may be driven at different speeds, means being provided so that the operator may select the speed required, and the camera will then run accordingly under the control of the usual governor. The invention contemplates a combination of a motor and a governor in such a manner that the governor is equally effective in controlling the motor within close limits at any selected speed. An important feature provides for automatically conditioning the electrical connections to the motor as each speed is selected by the operator. Other objects and advantages of the invention will be set forth in the specification, together with the drawing herewith, in which like reference characters indicate like parts throughout, and in which Fig. 1 is a side elevation, somewhat diagrammatic, of a motor and a governor therefor;

Figure 1:
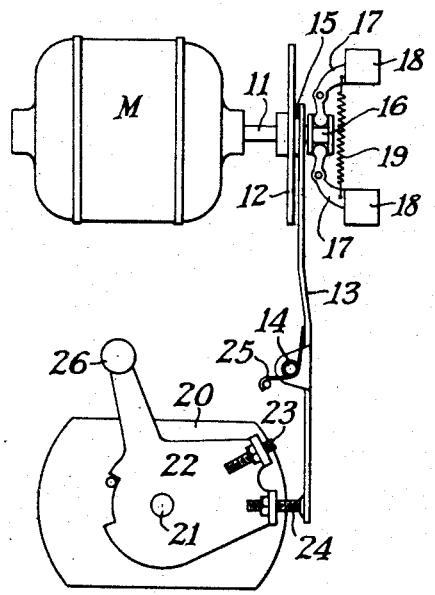

In Fig. 1, a motor M, which may drive the shutter and the film feed mechanism of a motion picture camera (not shown), has a shaft 11 carrying a disc 12. A lever 13 fulcrumed at 14 has a brake shoe 15 at its upper end, adapted to bear against and retard the disc 12 and therefore the motor. A spool member 16 on the motor shaft 11 is engaged by toggle arms 17 extending from governor weights 18, normally urged toward each other by a spring 19. The operation of the governor is the same as those in common use in spring-driven cameras, viz., an increase in speed causes the weights 18 to fly further apart, whereupon spool 16 is moved away from the motor and the disc 12 wipes against the brake shoe 15 and thereby holds the motor to a limited speed.

Near the lower end of lever 13 is a control member comprising a combined switch and mechanical stop, indicated in the drawings at 20. This switch carries on its pivot 21 a plate 22 on which are adjustable stop screws 23 and 24, the screw 24 extending farther from the pivot 21 than the screw 23. A spring 25 is arranged to bias the lever 13 in a clockwise direction so that its lower end bears positively against one of the screws 23 or 24, whichever is in the lowermost position, thereby establishing a definite position for the brake shoe 15 relatively to the disc 12. In the position shown, the lever 13 rests against the screw 24, and therefore the brake shoe 15 is closer to disc 12 than when the plate 22 is turned clockwise by means of the operating handle 26.

Fixed to the plate 22 or the shaft 21 thereof is an insulated crossarm 27 having a contact plate 28 on one end and a similar plate 29 on its other end. These plates are adapted, respectively, to bridge fixed contact posts 30, 31 and 34, 35, as in Fig. 3, or 31, 32 and 33, 34 as in Fig. 2. The position of the handle 26 is at all times consistent with the position of arm 27, as indicated in broken lines.

In a motion picture camera or the like, driven by a motor, the latter is usually a D. C. unit adapted for battery operation. The present invention includes the use of a plurality of batteries for high or low speeds of the motor respectively, the batteries being arranged in series for the higher speed and in parallel for the lower speed. The position of handle 26 determines each speed range.

Figure 2:
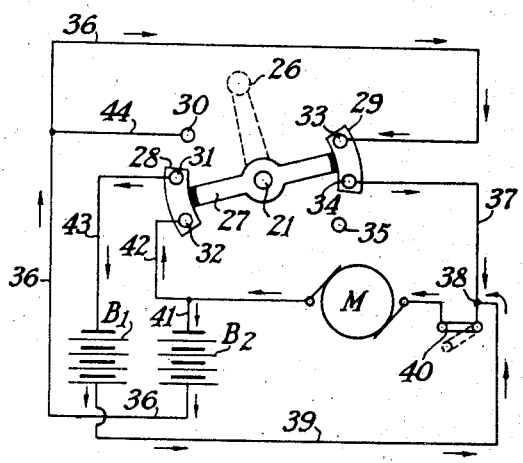
Fig. 2 is a diagram of the electrical connections when set up for slow speed operation.

Fig. 2 shows diagrammatically the wiring connections when the control handle 26 is moved to the low speed position, to place the batteries in parallel. Two batteries $B_1$ and $B_2$ are so arranged that with the arm 27 in the position shown, current from $B_2$ flows through wire 36 to post 33, thence through plate 29 to post 34 and wire 37 to junction 38. Current from $B_1$ flows through wire 39 to 38, and here the two sources combine and feed through manual switch 40 to motor M, back to $B_2$ through wire 41 and to $B_1$ through wire 42, post 32, plate 28, post 31 and wire 43. It is understood of course that the voltage is the same in both batteries. The motor then will run at low speed and the weights 18 will move outwardly a very slight amount, so that the brake shoe 15 will act on the disc 12 to retard the motor as soon as the latter slightly exceeds the low-speed maximum. Lever 13 cannot be forced out further because its lower end is bearing against the stop screw 24.

Figure 3:
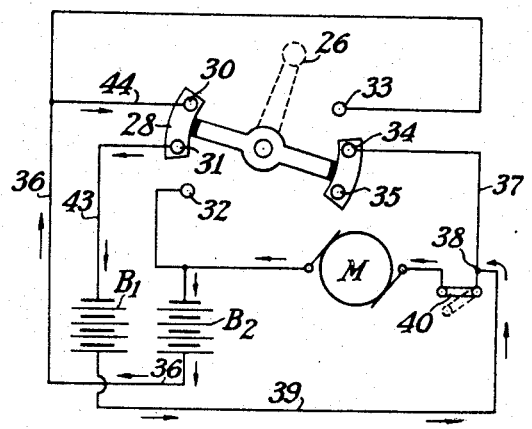
Fig. 3 is a similar diagram, when arranged for a higher speed.

If now the handle 26 is swung to the opposite end of its movement, as in Fig. 3, the electrical connections are changed accordingly, and the batteries can only work in series with each other and the motor, as follows: from $B_2$ to wires 36, 44, post 30, plate 28, post 31, wire 43, $B_1$, wire 39, switch 40, motor M, wire 42, to $B_2$. The batteries are therefore in series, the motor is subjected to a higher voltage, and its speed increases. As the stop screw 23 now is aligned with the lower end of lever 13, the disc 12 may move out farther before contacting the brake 15. As the motor speeds up it will quickly reach a predetermined limit, the governor will move the disc 12 against the brake, and the speed will be held constant at the higher limit.

Figure 4:
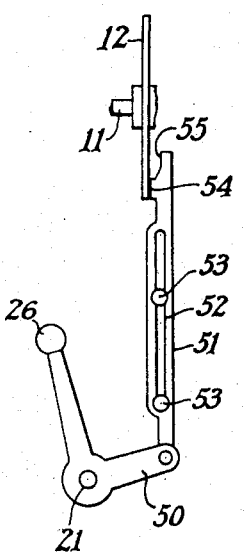
Figs. 4 and 5 are modified forms of the invention, partially diagrammatic as in Fig. 1.

In Fig. 4 a modification is illustrated wherein a crank 50 extending from handle 26 moves a bar 51 vertically. This bar is slotted at 52 and suitably guided, as by pins 53. In the position shown (low speed) a brake surface 54 is in position to check the disc 12, but when the handle 26 is moved to the high-speed position the bar 51 is retracted downwardly and a brake surface 55, farther out from the disc, is then the only part that the disc will contact.

Figure 5:
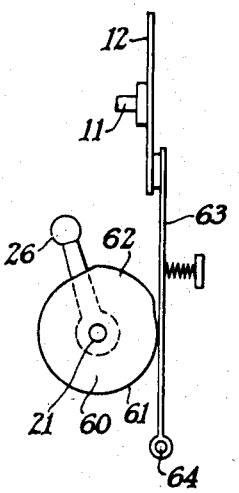

Fig. 5 indicates a lever 63, pivoted at 64 and spring-pressed toward the disc 12. A cam 60 on shaft 21 has a concentric periphery 61 against which the lever 63 bears when handle 26 is set for low speed, the brake 65 then being nearer the disc 12 than when the handle 26 is moved to high speed position, where a portion 62 of greater radius than the rim 61 forces lever 63 away from disc 12 to permit the latter to move out as the governor speeds up with the motor.

Modifications of the electrical circuits herewith illustrated may be devised, and the combined switch and brake-adjusting device may be differently designed without departing from the intent of the invention, the scope of which should be considered as encompassed within the following claims.

I claim:

1. In a speed control for a motor driven camera or the like, the combination, with a motor and a plurality of batteries, of a governor for the motor including a brake and a brake carrier, adjustable stops adapted to engage the brake carrier, electrical connections between the batteries and the motor including fixed contacts, a contact member movable with the stops, said electrical connections being so arranged that in one position of the stops the contact member closes a series circuit through the motor and batteries, and in another position of the stops said contact member closes a circuit through the motor with the batteries in parallel.

2. In a speed control for a motor driven camera or the like, the combination, with a motor and a plurality of batteries, of a governor for the motor including a brake and a brake carrier, adjustable stops adapted to engage the brake carrier to establish a high speed or a low speed limit for the motor, two sets of fixed contacts, electrical connections between the contacts, the batteries and the motor, and a control member movable with the stops to close a circuit through the motor with the batteries in series when the high-speed stop is effective, and to close a circuit with the batteries in parallel when the low-speed stop is effective.

3. In a speed control for a motor-driven camera or the like, the combination, with a motor adapted for battery operation, of a brake and a brake carrier, a movable control member comprising a circuit-closing member and stops adapted to engage the brake carrier to establish high and low-speed limits for the motor, a plurality of batteries, and two sets of fixed contacts connected with said batteries, said contacts being so arranged that when the brake carrier is in high speed position the circuit-closing member completes a circuit through the motor with the batteries in series, and when the brake carrier is in low-speed position said member completes a circuit through the motor with the batteries in parallel.

WILLIAM W. EATON.